US007012613B1

(12) United States Patent
Gruber et al.

(10) Patent No.: US 7,012,613 B1
(45) Date of Patent: Mar. 14, 2006

(54) METHOD AND APPARATUS FOR FRAGMENT SCRIPTOR FOR USE IN OVER-SAMPLING ANTI-ALIASING

(75) Inventors: Andrew E. Gruber, Arlington, MA (US); Stephen L. Morein, Cambridge, MA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/563,483

(22) Filed: May 2, 2000

(51) Int. Cl.
*G09G 5/00* (2006.01)

(52) U.S. Cl. .................... 345/582; 345/426; 345/611; 345/613

(58) Field of Classification Search ............... 345/582, 345/589, 611, 613, 614, 597, 426, 419, 422, 345/581, 522, 506, 629
See application file for complete search history.

(56) References Cited

U.S. PATENT DOCUMENTS

| 5,544,306 | A | | 8/1996 | Deering et al. | |
|---|---|---|---|---|---|
| 5,684,939 | A | * | 11/1997 | Foran et al. ................ | 345/612 |
| 5,990,904 | A | * | 11/1999 | Griffin ........................ | 345/631 |
| 6,055,615 | A | | 4/2000 | Okajima | |
| 6,172,680 | B1 | * | 1/2001 | Wong et al. ................ | 345/419 |
| 6,178,133 | B1 | | 1/2001 | Manning | |
| 6,252,608 | B1 | * | 6/2001 | Snyder et al. .............. | 345/473 |
| 6,433,788 | B1 | * | 8/2002 | Morein ........................ | 345/557 |
| 6,452,595 | B1 | * | 9/2002 | Montrym et al. ........... | 345/426 |
| 6,484,244 | B1 | | 11/2002 | Manning | |
| 6,900,812 | B1 | | 5/2005 | Morein | |

OTHER PUBLICATIONS

Deering, Michael F. et al.; "FBRAM: A new Form of Memory Optimized for 3D Graphics"; Sun Microsystems Computer Corporation.

* cited by examiner

*Primary Examiner*—Kimbinh T. Nguyen
(74) *Attorney, Agent, or Firm*—Vedder, Price, Kaufman & Kammholz, P.C.

(57) ABSTRACT

A method and apparatus for producing a fragment descriptor for use in oversampling anti-aliasing includes processing that begins by generating a single representative color value for a plurality of subpixels of a pixel. The processing then continues by generating a single representative Z value for the pixel. The processing continues by generating masking information for the pixel, wherein the masking information indicates, for a given object-element being rendered, coverage of the pixel by the object-element. The processing continues by packing the single representative color value, the single representative Z value, and the masking information into a fragment descriptor. The processing continues by transporting the fragment descriptor to a custom memory. When the custom memory receives the fragment descriptor it unpacks it to recapture the single representative color value, the single representative Z value and the masking information. The custom memory then duplicates the single representative color value for each subpixel of the pixel that is covered by the object-element based on the masking information. The custom memory then determines slope information for the pixel such that Z values may be determined for each subpixel. In addition, the custom memory generates color values and the Z values for each subpixel.

23 Claims, 5 Drawing Sheets

METHOD AND APPARATUS FOR
FRAGMENT SCRIPTOR FOR USE IN
OVER-SAMPLING ANTI-ALIASING

TECHNICAL FIELD OF THE INVENTION

This invention relates generally to video graphics processing and more particularly to three-dimensional video graphics processing having anti-aliasing.

BACKGROUND OF THE INVENTION

FIG. 1 illustrates a schematic block diagram of a video graphics processor 10 that includes a display engine 12, graphics controller 14, memory controller 16 and two dynamic random access memory devices (DRAM) 18 and 20. The graphics controller 14 includes a three-dimensional pipeline processor 22 and a rendering backend processor 24. The general function of the video graphics processor 12 is to receive geometric primitives from a central processing unit of a computer and to manipulate the geometric primitives, which define objects to be displayed, to produce pixel data.

To produce the pixel data, the graphics controller 14 generates color data, Z data, and texture coordinates from the geometric primitives. The color data includes an RGB (Red, Green, Blue) color components and may further include a fog value, an alpha-blending value, lighting effect values, etc. The Z data indicates the depth of a particular pixel based on the Z values of the original vertices of an object being rendered. The texture coordinates indicate coordinates to be used when retrieving texture information from a texture map, such that the object being rendered has a desired texture. The graphics controller 14 processes the color data, the texture coordinates, and Z the data on a pixel by pixel basis. Such processing involves the graphics controller 14 storing and retrieving a substantial amount of data to and from the DRAMs 18 and 20. As such, a substantial amount of data is being transmitted over the bus for each pixel. The amount of data stored and retrieved is increased when the graphics controller 14 performs anti-aliasing.

As is known, anti-aliasing is a technique that visually compensates for jagged edges of video display images that result because of the finite size of pixels. The visual compensation begins by creating subpixels masks for each object that is to be drawn within a pixel. For example, FIG. 2 illustrates a graphical representation of an object-element 34 being rendered on a plurality of pixels 30, where each pixel is shown to have four subpixels 32. Thus, when a subpixel mask is created, a determination is made as to the coverage area of each subpixel by the object-element 34. As can be seen in this illustration, only the center pixel is completely covered by the object-element 34. Each of the other pixels will include a subpixel mask indicating the percentage of coverage of object-element 34. The subpixel masks, the color data, and the Z data are processed by the graphics controller 14 as fragment information.

The resulting subpixel masks for a pixel are then processed to produce the final subpixel information for the given pixel. Part of this process will involve a comparison between the Z values of the new fragment and the Z values of subpixels from any other objects that share that pixel. Thus it is required that Z data from the memory be transported to the backend rendering engine. The Z values that result from the comparison operation must then be transmitted back to the memory 18 and 20.

Therefore, a need exists for a method and apparatus that improves the rate of transmission of fragment information within a video graphics processor thereby improving the overall efficiency of the video graphics processor.

DETAILED DESCRIPTION OF A PREFERRED EMBODIMENT

Generally, the present invention provides a method and apparatus for producing a fragment descriptor for use in oversampling anti-aliasing. Such a method and apparatus includes processing that begins by generating a single representative color value for a plurality of subpixels of a pixel. The processing then continues by generating a single representative Z value for the pixel. The processing continues by generating masking information for the pixel, wherein the masking information indicates, for a given object-element being rendered, coverage of the pixel by the object-element. Note that the masking information is derived at the subpixel level for the pixel. The processing continues by packing the single representative color value, the single representative Z value, and the masking information into a fragment descriptor. The processing continues by transporting the fragment descriptor to a custom memory. When the custom memory receives the fragment descriptor it unpacks it to recapture the single representative color value, the single representative Z value and the masking information. The custom memory then duplicates the single representative color value for each subpixel of the pixel that is covered by the object-element based on the masking information. The custom memory then determines slope information for the pixel such that Z values may be determined for each subpixel. In addition, the custom memory processing the duplicated color values and the Z values for each subpixel to produce the pixel data without communicating the data back to the three-dimensional graphics engine. With such a method and apparatus, the rate of transmission of fragment information within a video graphics processor is improved thereby improving the overall efficiency of the video graphics processor. As such, the three-dimensional graphics engine provides the representative color value, Z value and masking information of several sub-pixels in about the same bandwidth as is needed for complete subpixel information.

Figure 1:
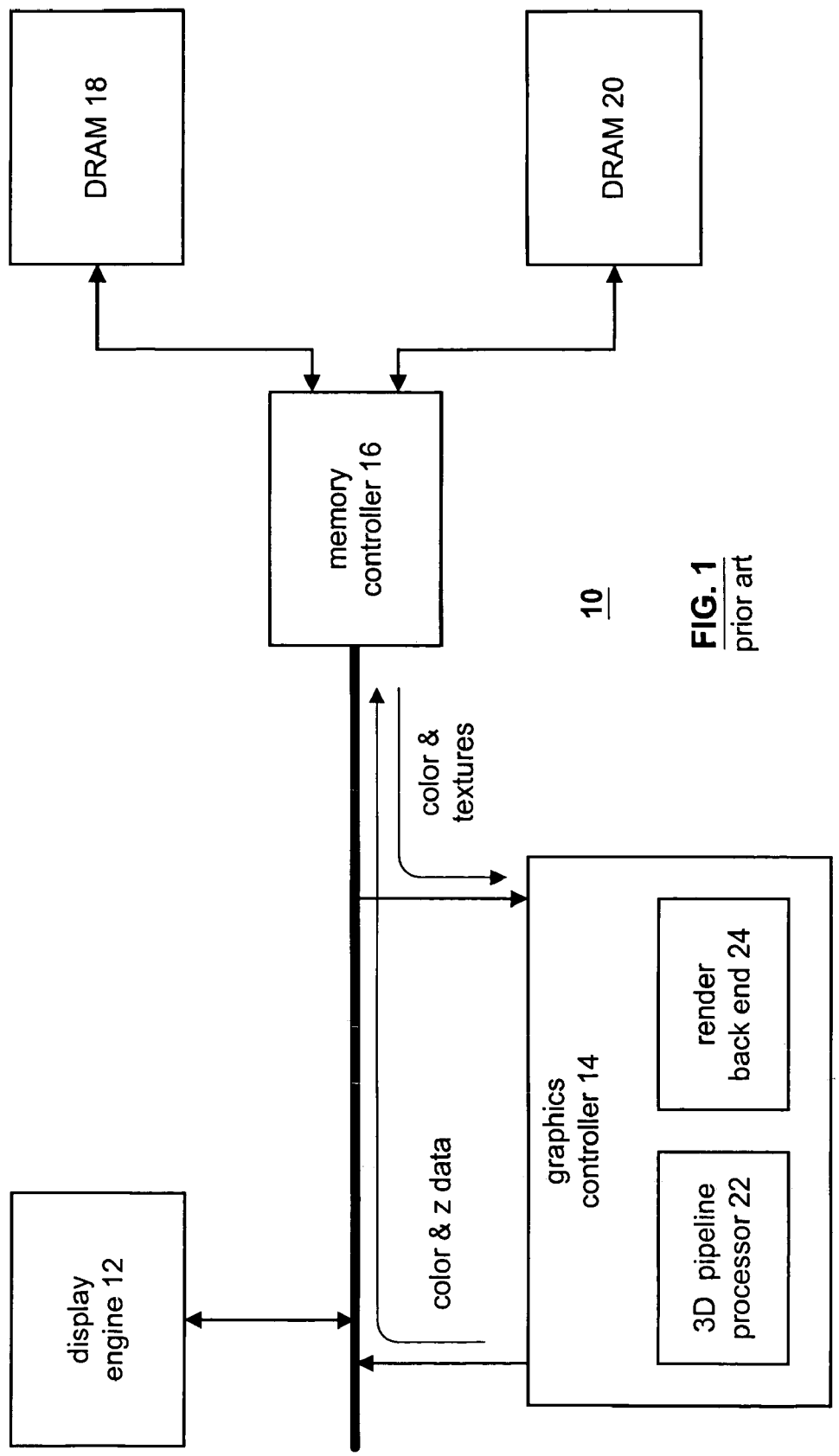
FIG. 1 illustrates a schematic block diagram of a video graphics processor in accordance with a prior art.
Figure 2:
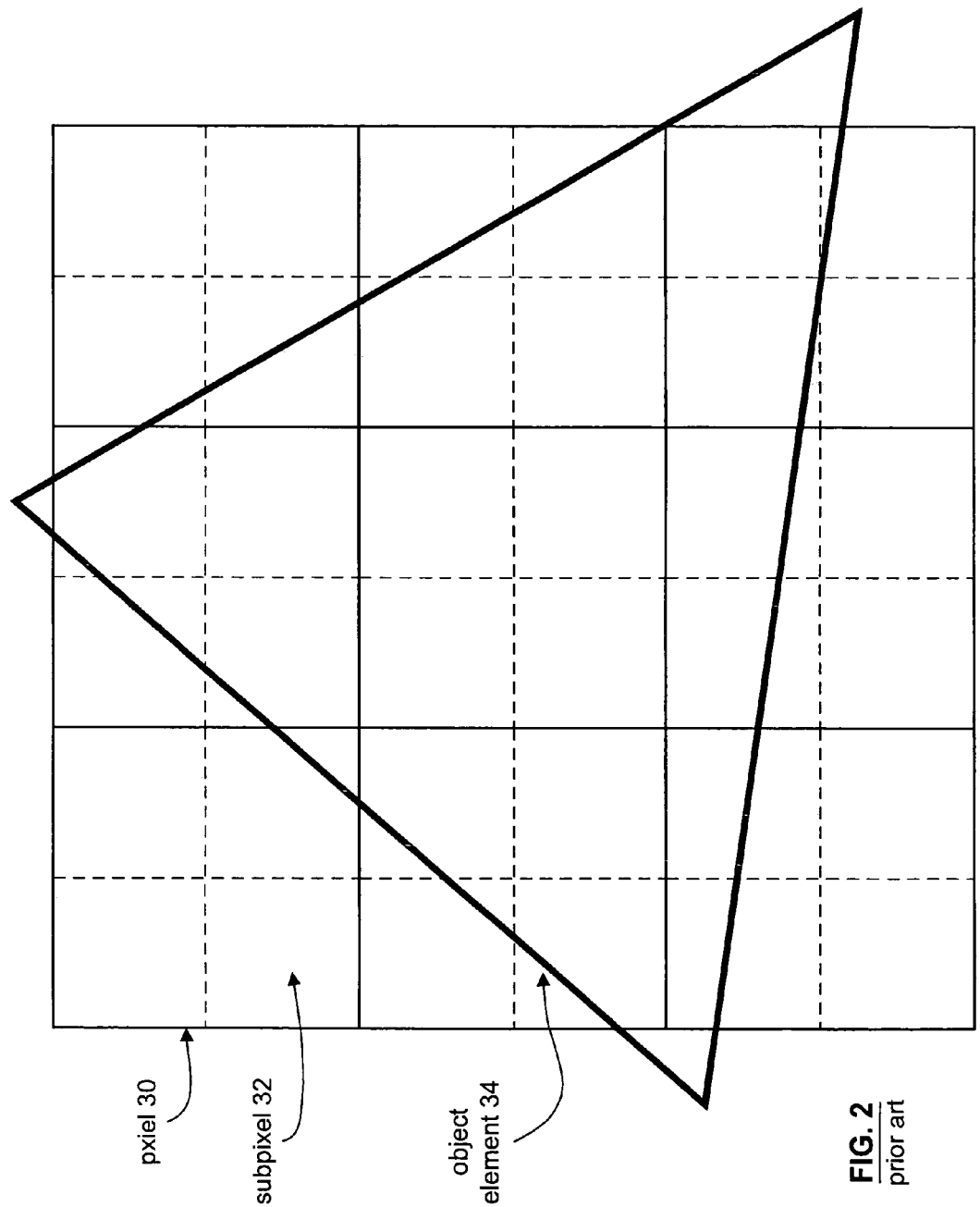
FIG. 2 illustrates a graphical representation of an object-element being rendered on a plurality of pixels in accordance with the prior art.
Figure 3:
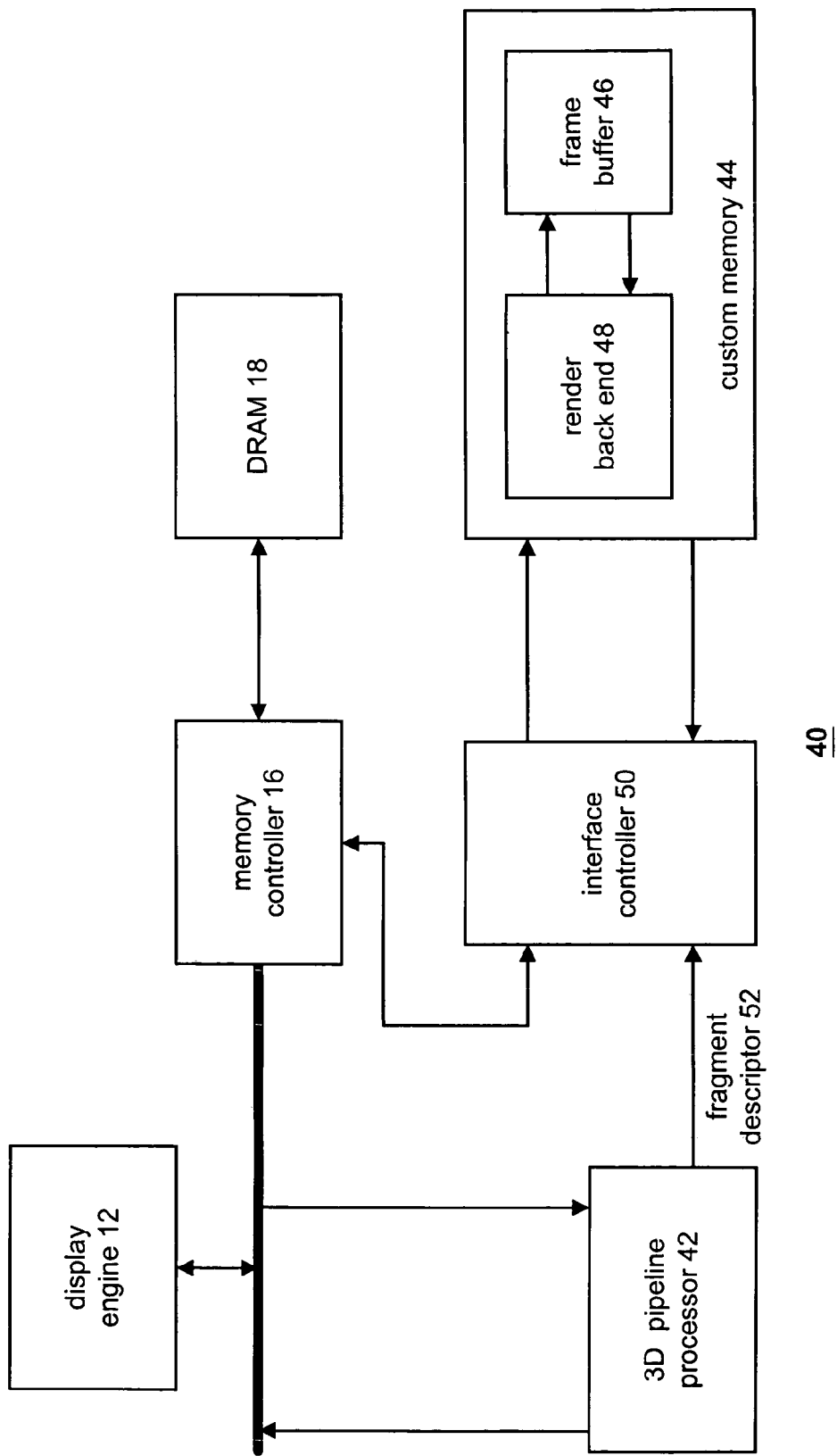
FIG. 3 illustrates a schematic block diagram of a video graphics processor in accordance with the present invention.

The present invention can be more fully described with reference to FIGS. 3 through 7. FIG. 3 illustrates a video graphics processor 40 that includes the display engine 12, the memory controller 16, DRAM 18, a three-dimensional pipeline processor 42, an interface controller 50, and custom memory 44. The custom memory 44 includes a rendering backend engine 48 and a frame buffer 46. In operation, the three-dimensional pipeline processor 42 generates fragment descriptors 52, which are provided to the interface controller 50. The fragment descriptor 52 includes a single representative color value for a plurality of subpixels of a pixel and a single representative Z value for the pixel. The representative color information may be derived based on the color values of the original vertices of the object-element being rendered and the pixel location within the object-element. As is known, slope information for the object-element is determined with respect to each original vertex. Based on the slope information and the color information for each vertex, color information for any pixel within the object-element may be readily determined. The determination of the representative Z value may be obtained in a similar manner. For example, each vertex of the object-element to be rendered will include a corresponding Z value. From the Z values of the vertices, slope information for the object-element may be determined. Based on the slope information (which only requires that two slopes to be determined), the pixel location within the object-element, and the corresponding Z values of the vertices, the representative Z value for a particular pixel may be readily determined.

The fragment descriptor 52 may also include masking information for the particular pixel. The masking information indicates the subpixel coverage of the pixel by the object-element being rendered. There are a variety of known methods for generating the masking information anyone of which will suffice for the purposes of this invention.

Having generated the single representative color value, the single representative Z value, and the masking information, the three-dimensional pipeline processor 42 packs these values into the fragment descriptor 52. Note that by sending one color value, which is 32 bits in length, one masking value, which is 4 bits in length and sending one Z value, which is 32 bits in length, only 68 bits of information is transmitted within the fragment descriptor. In prior art embodiments up to 512 bits of information were transmitted from the three-dimensional pipe to the memory controller for storage in the memory devices 18 and 20. For example, for a 4 times oversampling system, four color values at 32 bits each were sent along with four Z values of 32 bits each, totaling 256 bits. For an 8× oversampling anti-aliasing system, 8 color value of 32 bits each and 8 Z values of 32 bits each are sent, totaling 512 bits.

If the bandwidth of the bus between the three-dimensional pipeline processor 42 and the interface controller 50 is 256 bits or 512 bits, multiple fragment descriptors may be transported in parallel. This will be discussed in greater detail below.

The interface controller 50, upon receiving the fragment descriptor 52, provides it to the custom memory 44. The rendering backend engine 48 of the custom memory 44 unpacks the fragment descriptor to recapture the representative color value, the representative Z value, and the masking information for each pixel being transported for this given interval. Having unpacked the fragment descriptor, the rendering backend engine 48 obtains Z slope information such that it may determine Z values for each subpixel of the pixel. The Z slope information may be obtained in a plurality of ways as will be described with reference to FIGS. 4 through 7. In addition, the rendering backend engine 48 duplicates the representative color value for each of the subpixels. The duplicated color values and the individual Z values for each subpixel is then stored in frame buffer 46. As further object-elements are rendered that occupy the same pixels, the rendering backend engine 48 may update the subpixel color information based on which object-element is in a foreground position with respect to other object-elements for the given pixel. Once all object-elements have been processed, final color value for the pixel is based on coverage of the pixel by the object-elements in accordance with their contribution to the coverage of the pixel. The backend engine 48 may optionally provide a single pixel value for each object element for the given pixel back to the video graphics processor 40, by averaging all the sub-pixels colors from the different object elements, weighted by their sub-pixel coverage.

Figure 4:
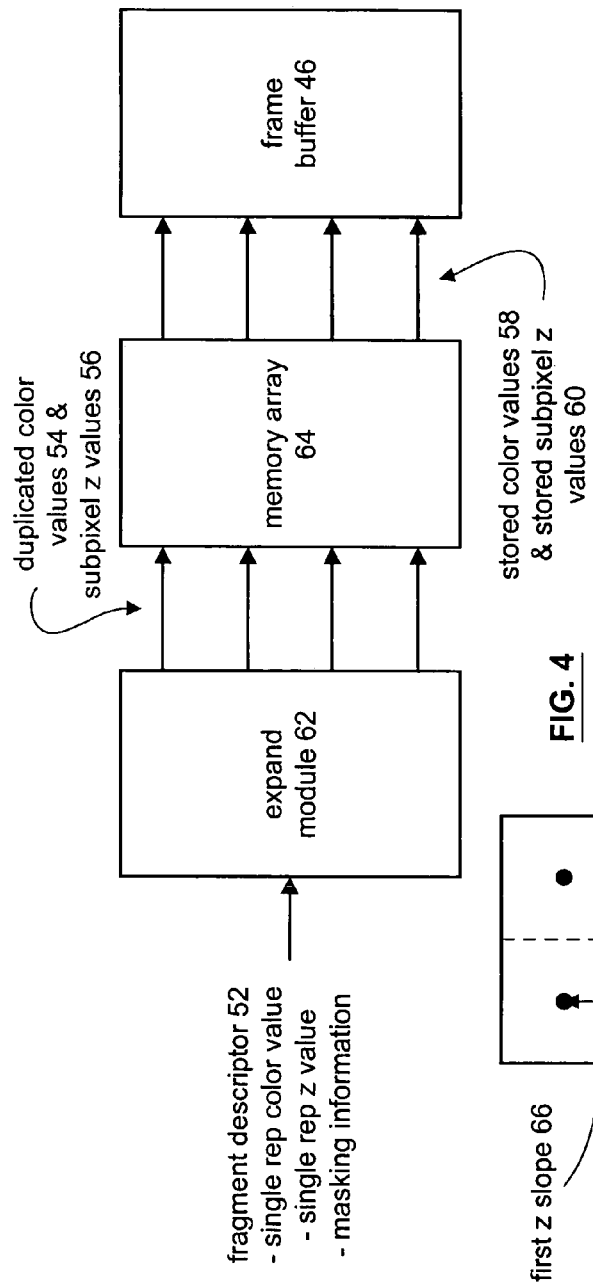
FIG. 4 illustrates a schematic block diagram of a portion of the video graphics processor of FIG. 3.

FIG. 4 illustrates a schematic block diagram of the unpacking process performed in the custom memory 44. As shown, the custom memory 44 includes an expanding module 62, a memory array 64, and the frame buffer 46. The expanding module 62 is operably coupled to receive the fragment descriptor 52. The fragment descriptor includes the single representative color value of a pixel, a single representative Z value of the pixel and corresponding masking information for the pixel. Note that multiple fragment descriptors may be included for multiple pixels. For example, in an 8X oversampling anti-aliasing process, a block of four pixels may be transmitted at any time across the interface between the three-dimensional pipeline processor 42 and the interface controller 50. Further note that the three-dimensional pipeline processor 42 may be fabricated on a separated integrated circuit from the interface controller 50 and the custom memory 44.

The expanding module 62 expands the fragment descriptor 52 by duplicating the color values for each subpixel and generates the subpixel Z values 56. The expanding module 62 generates the subpixel Z values 56 based on Z slope information that may be received within the fragment descriptor 52, derived from first and second slopes received within the fragment descriptor, or determined based on slopes of the object-element.

The memory array 64 is operably coupled to receive the duplicated color values 54 and the subpixels Z values 56. The memory array 64 segregates the duplicated color values and subpixels Z values for each pixel contained in the packet received from the three-dimensional pipeline engine 42. Having separated this information based on pixels, the memory array 64 provides stored color values 58 and stored subpixel Z value 60 to the frame buffer 46. In addition, the memory array 64 performs a Z test, i.e., determining which object element is in a foreground position with respect to previously processed object-elements and determining a color value for each sub-pixel. Such Z testing and color value generation is known, thus no further discussion will be presented except to further illustrate the present invention.

Figure 6:
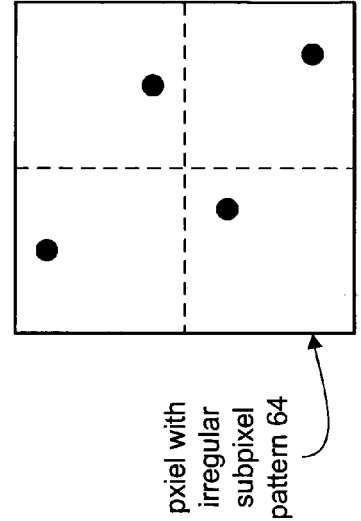
FIG. 6 illustrates a graphical representation of a pixel having an irregular subpixel pattern in accordance with the present invention.
Figure 5:
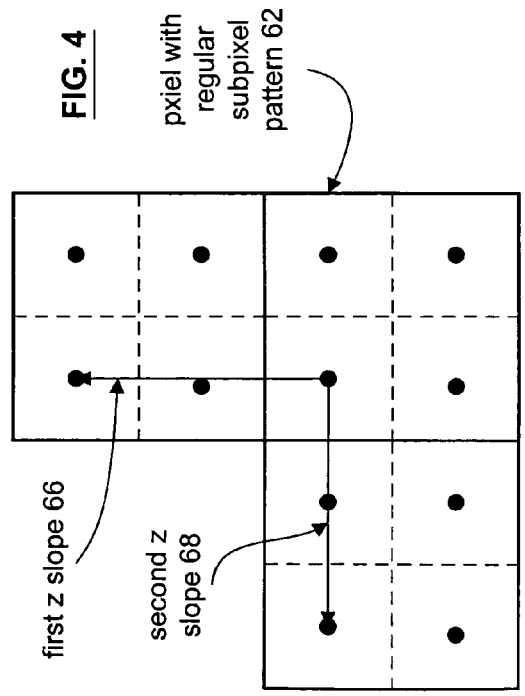
FIG. 5 illustrates a graphical representation of pixels with regular subpixels patterns in accordance with the present invention.

FIGS. 5 and 6 illustrate a pixel including a plurality of subpixels. FIG. 5 illustrates the pixel having a regular subpixel pattern 62. As shown, the regular subpixel pattern has the reference point for the subpixel in the center of the subpixel. FIG. 6 illustrates the pixel having an irregular subpixel pattern 64. As shown, the reference point for the subpixel is not positioned in the center of the subpixel. As is known, by utilizing the irregular subpixel pattern 64 horizontal and vertical span performances are enhanced.

Regardless of whether the pixel includes a regular subpixel pattern 62 or an irregular pixel pattern 64, the first Z slope 66 and second Z slope 68 may readily be determined by having the information for two adjacent pixels. As shown in FIG. 5, three pixels are shown where each pixel has its own representative Z value. By utilizing basic geometric mathematics, a first Z slope 66 may be determined with respect to one pixel and a second Z slope 68 may be determined with respect to a second pixel. Based on the first and second Z slopes 66 and 68, the slope of the object-element may be determined as well as the slope for each individual pixel. Having the slope for each individual pixel, the Z values for each subpixel of the corresponding pixel may be readily determined.

Figure 7:
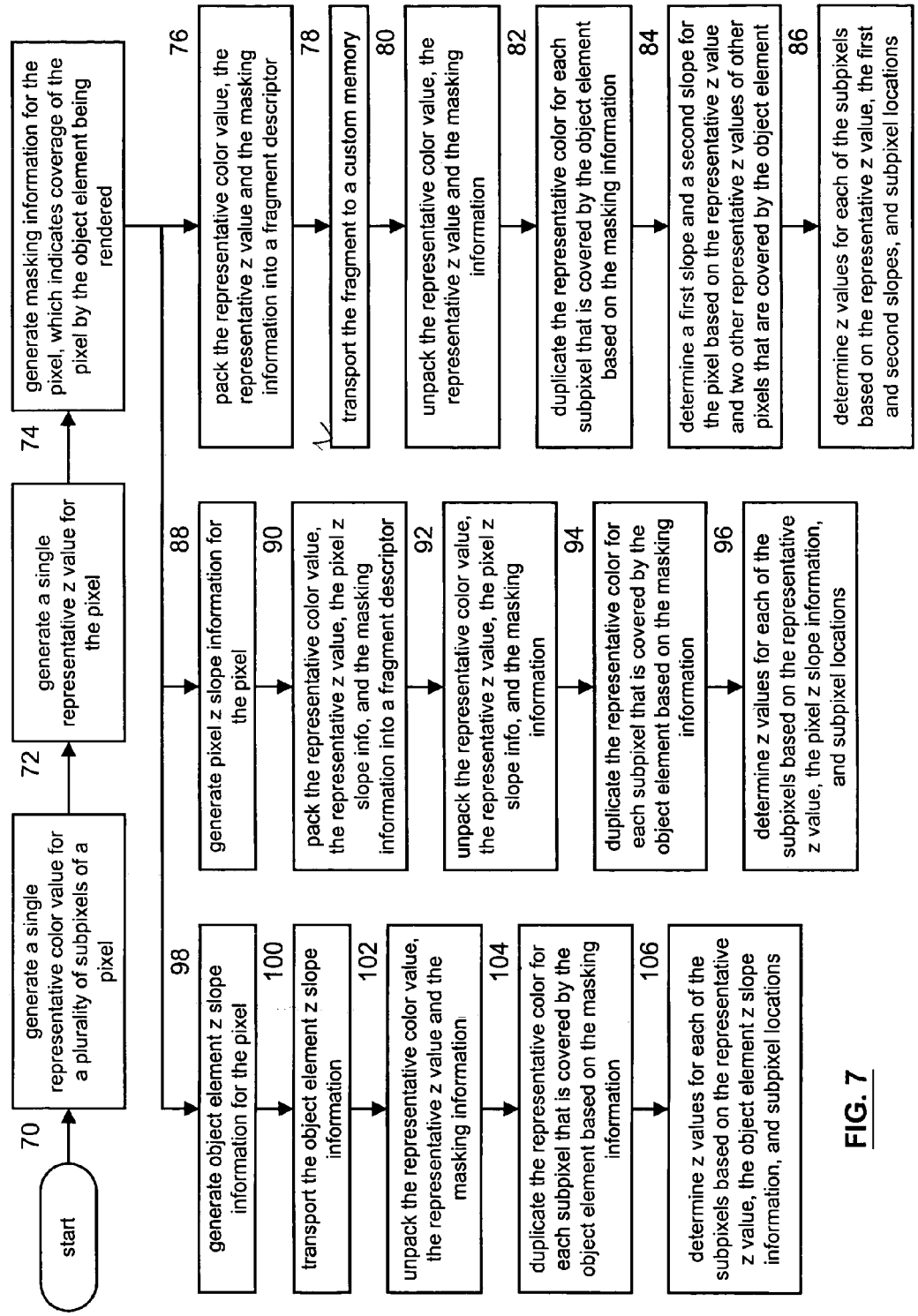
FIG. 7 illustrates a logic diagram of a method for producing a fragment descriptor for use in over sampling anti-aliasing in accordance with the present invention.

FIG. 7 illustrates a logic diagram of a method for producing a fragment descriptor for use in oversampling anti-aliasing. Note that the processing steps shown in FIG. 7 may be stored in memory and executed by a processing module. The memory and processing module may be included within the three-dimensional pipeline processor 42 and within the custom memory 44. Further note that the processing module may be a single processing device or a plurality of processing devices. Such a processing device may be a microprocessor, microcontroller, digital signal processor, state machine, logic circuitry, and/or any device that manipulates signals (analog or digital) based on operational instructions. The memory may be a single memory device or a plurality of memory devices. Such a memory device may be a ROM, RAM, flash memory, virtual memory, floppy disk, hard drive memory, and/or any device that stores digital information. Further note that when the processing module implements one or more of its functions via a state machine or logic circuitry, the memory storing the corresponding operational instructions is embedded within the circuitry comprising the state machine and/or logic circuitry.

The process begins at step 70 where a single representative color value for a plurality of subpixels of a pixel is generated. As previously discussed, the single representative color value may be readily determined based on the color values of each original vertices of the object-element being rendered and the slope of the object-element. The processing then proceeds to step 72 where a single representative Z value of the pixel is generated. The single representative Z value may be readily obtained from the Z values of the original vertices of the object-element being rendered and the slope of the object-element. The process then proceeds to step 74 where masking information for the pixel is generated. The masking information indicates, on a subpixel level, the coverage of the pixel by the object-element being rendered.

The process may then proceed to steps 76 through 86, steps 88 through 96, or steps 98 through 106. Each of these blocks of steps performs a similar function just in different manners. At step 76, the representative color value, the representative Z value and the masking information are packed into a fragment descriptor. The process then proceeds to step 78 where the fragment descriptor is transported to a custom memory. Note that a plurality of fragment descriptors may be transported simultaneously to the custom memory. The process then proceeds to step 80 where the custom memory unpacks the representative color value, the representative Z value, and the masking information. The process then proceeds to step 82 where the custom memory duplicates the representative color value for each subpixel that is covered by the object element based on the masking information. As such, if the masking information indicates that a particular subpixel is covered by the object-element, the custom memory duplicates the representative color value for that particular subpixel.

The process then proceeds to step 84 where the custom memory determines a first and second slope for the pixel based on the representative Z value and two other representative Z values of other pixels that are covered by the object-element. This was discussed with reference to FIG. 5. The process then proceeds to step 86 where the custom memory determines Z values for each of the subpixels based on the representative Z value, the first and second Z slopes, and the particular subpixel location. Such a determination is readily made utilizing basic geometric mathematics. Once the representative Z values are determined, they are stored in the frame buffer. Note that the subpixel arrangement may include a regular pattern or an irregular pattern as illustrated in FIGS. 5 and 6.

At step 88, the processing continues by generating pixel Z slope information for the pixel. This would be done within the three-dimensional pipeline engine 42. The process then proceeds to step 90 where the three-dimensional pipeline processor 42 packs the representative color value, the representative Z value, the pixel Z slope information, and the masking information into a fragment descriptor. The fragment descriptor is transported to the custom memory.

The process then proceeds to step 92 where the custom memory unpacks the representative color value, the representative Z value, the pixel Z slope information and the masking information. The custom memory then duplicates the representative color value for each subpixel that is covered by the object-element based on the masking information. The process then proceeds to step 96 where the custom memory determines Z values for each of the subpixels based on the representative Z value, the pixel slope information, and the particular subpixel location.

At step 98, the three-dimensional pipeline processor 42 generates object-element Z slope information for the pixel. This Z slope information is at the object-element level. The process then proceeds at step 100 where the object-element Z slope is transported to the custom memory along with the fragment descriptor. The fragment descriptor includes the representative color value, the representative Z value and the masking information. The process then proceeds to step 102 where the custom memory unpacks the representative color value, the representative Z value, and the masking information.

The process then proceeds to step 104 where the custom memory duplicates the representative color value for each subpixel that is covered by the object-element based on the masking information. The process then proceeds to step 106 where the custom memory determined Z values for each of the subpixels based on the representative Z value, the object-element, Z slope information, and the subpixels locations.

The preceding discussion has presented a method and apparatus for producing a fragment descriptor for use in oversampling anti-aliasing. By utilizing such a fragment descriptor, multiple fragment descriptors may be transported to a custom memory in a single interval. In addition, the custom memory substantially reduces the thrashing of data within a video graphics processor to render final pixel information. As one of average skill in the art would appreciate, other embodiments may be derived from the teaching of the present invention without deviating from the scope of the claims.

What is claimed is:

1. A method for producing a fragment descriptor for use in oversampling anti-aliasing, the method comprises the steps of:
   a) generating a single representative color value for a plurality of subpixels of a pixel;
   b) generating a single representative z value for the pixel;
   c) generating masking information for the pixel, wherein the masking information indicates, for a given object element being rendered, coverage of the pixel by the object element;
   d) packing the single representative color value, the single representative z value and the masking information into the fragment descriptor; and
   e) transporting the fragment descriptor to a custom memory.

2. The method of claim 1 further comprises:
unpacking the fragment descriptor to recapture the single representative color value, the single representative z value, and the masking information;
duplicating the single representative color value for each subpixel of the plurality of subpixels that is covered by the object element based on the masking information;
determining a first slope and a second slope for the pixel based on the representative z value and two other representative z values of other pixels that are at least partially covered by the object element; and
determining z values for each of the plurality of subpixels based on the single representative z value, the first and second slopes, and subpixel locations.

3. The method of claim 2 further comprises:
storing, for each subpixel of the plurality of subpixels that is covered by the object element, the duplicated representative color value at a corresponding memory location; and
storing, for each subpixel of the plurality of subpixels in the corresponding memory locations, a corresponding z value determined from the single representative z value, the first and second slopes, and subpixel locations.

4. The method of claim 2, wherein the subpixel locations are arranged in a regular pattern or an irregular pattern.

5. The method of claim 1 further comprises:
generating pixel z slope information for the pixel; and
packing the pixel z slope information into the fragment descriptor.

6. The method of claim 5 further comprises:
unpacking the fragment descriptor to recapture the single representative color value, the single representative z value, the pixel z slope information, and the masking information;
duplicating the single representative color value for each subpixel of the plurality of subpixels that is covered by the object element based on the masking information; and
determining z values for each of the plurality of subpixels based on the single representative z value, the pixel z slope information, and subpixel locations.

7. The method of claim 1 further comprises:
generating object element z slope information for the object element; and
transporting the object element z slope information to the custom memory.

8. The method of claim 7 further comprises:
unpacking the fragment descriptor to recapture the single representative color value, the single representative z value, and the masking information;
duplicating the single representative color value for each subpixel of the plurality of subpixels that is covered by the object element based on the masking information; and
determining z values for each of the plurality of subpixels based on the single representative z value, the object element z slope information, and subpixel locations.

9. The method of claim 1 further comprises:
generating a second and third representative color value for a second and third plurality of subpixels of a second pixel and a third pixel, respectively;
generating second and third representative z values for the second and third pixels, respectively;
generating second and third masking information for the second and third pixels, respectively, wherein the second and third masking information indicates, for the given object element being rendered, coverage of the second pixel by the object element;
packing the second and third representative color values, the second and third representative z values, and the second and third masking information into second and third fragment descriptors, respectively; and
transporting the fragment descriptor, the second fragment descriptor, and the third fragment descriptor to the custom memory.

10. The method of claim 9 further comprises:
unpacking the second and third fragment descriptors to recapture the second and third representative color values, the second and third representative z values, and the second and third masking information;
duplicating the second and third representative color values for each subpixel of the second and third plurality of subpixels that is covered by the object element based on the second and third masking information, respectively;
determining slope information for the second and third pixels based on the representative z value and the second and third representative z values; and
determining z values for each of the second and third plurality of subpixels based on the second and third representative z value, the slope information, and subpixel locations, respectively.

11. An apparatus for producing a fragment descriptor for use in oversampling anti-aliasing, the apparatus comprises:
a processing module; and
memory operably coupled to the processing module, wherein the memory stores operational instructions that cause the processing module to: (a) generate a single representative color value for a plurality of subpixels of a pixel; (b) generate a single representative z value for the pixel; (c) generate masking information for the pixel, wherein the masking information indicates, for a given object element being rendered, coverage of the pixel by the object element; (d) pack the single representative color value, the single representative z value, and the masking information into the fragment descriptor; and (e) transport the fragment descriptor to a custom memory.

12. The apparatus of claim 11, wherein the memory further comprises operational instructions that cause the processing module to:
unpack the fragment descriptor to recapture the single representative color value, the single representative z value, and the masking information;
duplicate the single representative color value for each subpixel of the plurality of subpixels that is covered by the object element based on the masking information;
determine a first slope and a second slope for the pixel based on the representative z value and two other representative z values of other pixels that are at least partially covered by the object element; and
determine z values for each of the plurality of subpixels based on the single representative z value, the first and second slopes, and subpixel locations.

13. The apparatus of claim 12, wherein the memory further comprises operational instructions that cause the processing module to:
store, for each subpixel of the plurality of subpixels that is covered by the object element, the duplicated representative color value at a corresponding memory location; and
store, for each subpixel of the plurality of subpixels in the corresponding memory locations, a corresponding z value determined from the single representative z value, the first and second slopes, and subpixel locations.

14. The apparatus of claim 12, wherein the subpixel locations are arranged in a regular pattern or an irregular pattern.

15. The apparatus of claim 11, wherein the memory further comprises operational instructions that cause the processing module to:
generate pixel z slope information for the pixel; and
pack the pixel z slope information into the fragment descriptor.

16. The apparatus of claim 15, wherein the memory further comprises operational instructions that cause the processing module to:
unpack the fragment descriptor to recapture the single representative color value, the single representative z value, the pixel z slope information, and the masking information;
duplicate the single representative color value for each subpixel of the plurality of subpixels that is covered by the object element based on the masking information; and
determine z values for each of the plurality of subpixels based on the single representative z value, the pixel z slope information, and subpixel locations.

17. The apparatus of claim 11, wherein the memory further comprises operational instructions that cause the processing module to:
generate object element z slope information for the object element; and
transport the object element z slope information to the custom memory.

18. The apparatus of claim 17, wherein the memory further comprises operational instructions that cause the processing module to:
unpack the fragment descriptor to recapture the single representative color value, the single representative z value, and the masking information;
duplicate the single representative color value for each subpixel of the plurality of subpixels that is covered by the object element based on the masking information; and
determine z values for each of the plurality of subpixels based on the single representative z value, the object element z slope information, and subpixel locations.

19. The apparatus of claim 11, wherein the memory further comprises operational instructions that cause the processing module to:
generate a second and third representative color value for a second and third plurality of subpixels of a second pixel and a third pixel, respectively;
generate second and third representative z values for the second and third pixels, respectively;
generate second and third masking information for the second and third pixels, respectively, wherein the second and third masking information indicates, for the given object element being rendered, coverage of the second pixel by the object element;
pack the second and third representative color values, the second and third representative z values, and the second and third masking information into second and third fragment descriptors, respectively; and
transport the fragment descriptor, the second fragment descriptor, and the third fragment descriptor to the custom memory.

20. The apparatus of claim 19, wherein the memory further comprises operational instructions that cause the processing module to:
unpack the second and third fragment descriptors to recapture the second and third representative color values, the second and third representative z values, and the second and third masking information;
duplicate the second and third representative color values for each subpixel of the second and third plurality of subpixels that is covered by the object element based on the second and third masking information, respectively;
determine slope information for the second and third pixels based on the representative z value and the second and third representative z values; and
determine z values for each of the second and third plurality of subpixels based on the second and third representative z value, the slope information, and subpixel locations, respectively.

21. A method for producing a fragment descriptor for use in oversampling anti-aliasing, the method comprises the steps of:
a) generating a single representative color value for a plurality of subpixels of a pixel;
b) generating a single representative z value for the pixel;
c) generating masking information for the pixel, wherein the masking information indicates, for a given object element being rendered, coverage of the pixel by the object element; and
d) packing the single representative color value, the single representative z value and the masking information into the fragment descriptor.

22. The method of claim 21 further comprises:
unpacking the fragment descriptor to recapture the single representative color value, the single representative z value, and the masking information;
duplicating the single representative color value for each subpixel of the plurality of subpixels that is covered by the object element based on the masking information;
determining a first slope and a second slope for the pixel based on the representative z value and two other representative z values of other pixels that are at least partially covered by the object element; and
determining z values for each of the plurality of subpixels based on the single representative z value, the first and second slopes, and subpixel locations.

23. A memory comprising:
a rendering back end engine operative to:
unpack the fragment descriptor to recapture the single representative color value, the single representative z value, and the masking information;
duplicate the single representative color value for each subpixel of the plurality of subpixels that is covered by the object element based on the masking information;
determine a first slope and a second slope for the pixel based on the representative z value and two other representative z values of other pixels that are at least partially covered by the object element;
determine z values for each of the plurality of subpixels based on the single representative z value, the first and second slopes, and subpixel locations; and
a frame buffer, operatively coupled to the back end rendering engine.

* * * * *